(12) United States Patent
Smith et al.

(10) Patent No.: US 9,291,637 B2
(45) Date of Patent: Mar. 22, 2016

(54) SYSTEM AND METHOD FOR DAMPING A WIND VANE

(75) Inventors: R. Paul Smith, Burlington, VT (US); Henry Bush, Richmond, VT (US); Emir Heco, Essex Junction, VT (US)

(73) Assignee: NRG Systems Inc., Hinesburg, VT (US)

( * ) Notice: Subject to any disclaimer, the term of this patent is extended or adjusted under 35 U.S.C. 154(b) by 955 days.

(21) Appl. No.: 13/332,004

(22) Filed: Dec. 20, 2011

(65) Prior Publication Data

US 2012/0156036 A1  Jun. 21, 2012

Related U.S. Application Data

(60) Provisional application No. 61/425,228, filed on Dec. 20, 2010.

(51) Int. Cl.
*G01P 13/02* (2006.01)

(52) U.S. Cl.
CPC ...................... *G01P 13/02* (2013.01)

(58) Field of Classification Search
CPC ...................................... G01P 13/02
USPC ........ 73/170.05, 514.14; 290/44, 55; 415/4.3, 415/4.5, 119, 123; 416/9, 169 R, 500
See application file for complete search history.

(56) References Cited

U.S. PATENT DOCUMENTS

| | | | | |
|---|---|---|---|---|
| 2,142,951 A * | 1/1939 | Mead | | 73/507 |
| 3,196,678 A | 7/1965 | Di Toro | | |
| 3,217,536 A * | 11/1965 | Motsinger et al. | | 73/170.15 |
| 3,641,815 A * | 2/1972 | Fassett, II | | 73/170.03 |
| 4,454,757 A * | 6/1984 | Weinstein et al. | | 73/170.11 |
| 5,215,169 A * | 6/1993 | Kuwahara | | 188/164 |
| 5,783,885 A * | 7/1998 | Post | | 310/90.5 |
| 6,918,294 B1 * | 7/2005 | Roberge | | 73/170.02 |
| 6,918,469 B1 * | 7/2005 | Pribonic et al. | | 188/165 |
| 7,118,339 B2 * | 10/2006 | Moroz et al. | | 416/1 |
| 8,581,463 B2 * | 11/2013 | Post | | 310/90.5 |
| 2006/0278478 A1 | 12/2006 | Pribonic et al. | | |
| 2010/0080702 A1 | 4/2010 | Matsuo et al. | | |
| 2010/0133838 A1 | 6/2010 | Borgen | | |
| 2010/0278636 A1 | 11/2010 | Richter | | |
| 2012/0156036 A1 * | 6/2012 | Smith et al. | | 416/1 |
| 2014/0077646 A1 * | 3/2014 | Osterberg | | 310/104 |

OTHER PUBLICATIONS

Cheah, "Novel Eddy Current Damping Mechanism for Passive Magnetic Bearings," Journal of Vibration and Control, Nov. 2008 vol. 14 No. 11 pp. 1749-1766.
Sodano, et al., "Eddy Current Damping in Structures," The Shock and Vibration Digest, vol. 36, No. 6., Nov. 2004, pp. 469-478.

(Continued)

*Primary Examiner* — Ninh H Nguyen
*Assistant Examiner* — Christopher R Legendre
(74) *Attorney, Agent, or Firm* — Grossman, Tucker, Perreault & Pfleger, PLLC

(57) ABSTRACT

A system for damping a wind vane includes a damping assembly configured to utilize eddy currents to dampen rotational motion of at least a portion of the wind vane. The damping assembly may provide damping of the wind vane to accommodate for sudden changes in wind speed and/or direction while allowing the wind vane to maintain accurate measurements and response in low wind conditions. The damping assembly may reduce the wind vane's susceptibility to oscillation, thereby improving accuracy of the wind vane.

21 Claims, 8 Drawing Sheets

(56) References Cited

OTHER PUBLICATIONS

Sodano, et al., "Improved Concept and Model of Eddy Current Damper," Transactions of the ASME vol. 128, Jun. 2006, pp. 294-302.
Ebrahimi, et al., "Permanent magnet configuration in design of an eddy current damper," Microsyst Technol (2010) 16:19-24.
Starin, et al., "Eddy Current Damper Simulation and Modeling," Proceedings of the 9th European Space Mechanisms and Tribology Symposium, Sep. 19-21, 2001, Liège, Belgium. ESA Publications Division, ISBN 92-9092-761-5, 2001, p. 321-326.
Wieringa, "Evaluation and Design of Wind Vanes," 1967: Evaluation and Design of Wind Vanes. J. Appl. Meteor., 6, 1114-1122.
Wikipedia, "Halbach array," available at: http://en.wikipedia.org/wiki/Halbach_array; retrieved on Apr. 16, 2012; last revised Mar. 25, 2012 (8 pages).
International Search Report and Written Opinion mailed Apr. 13, 2012 in corresponding PCT Patent Application Serial No. PCT/US11/66230.

\* cited by examiner

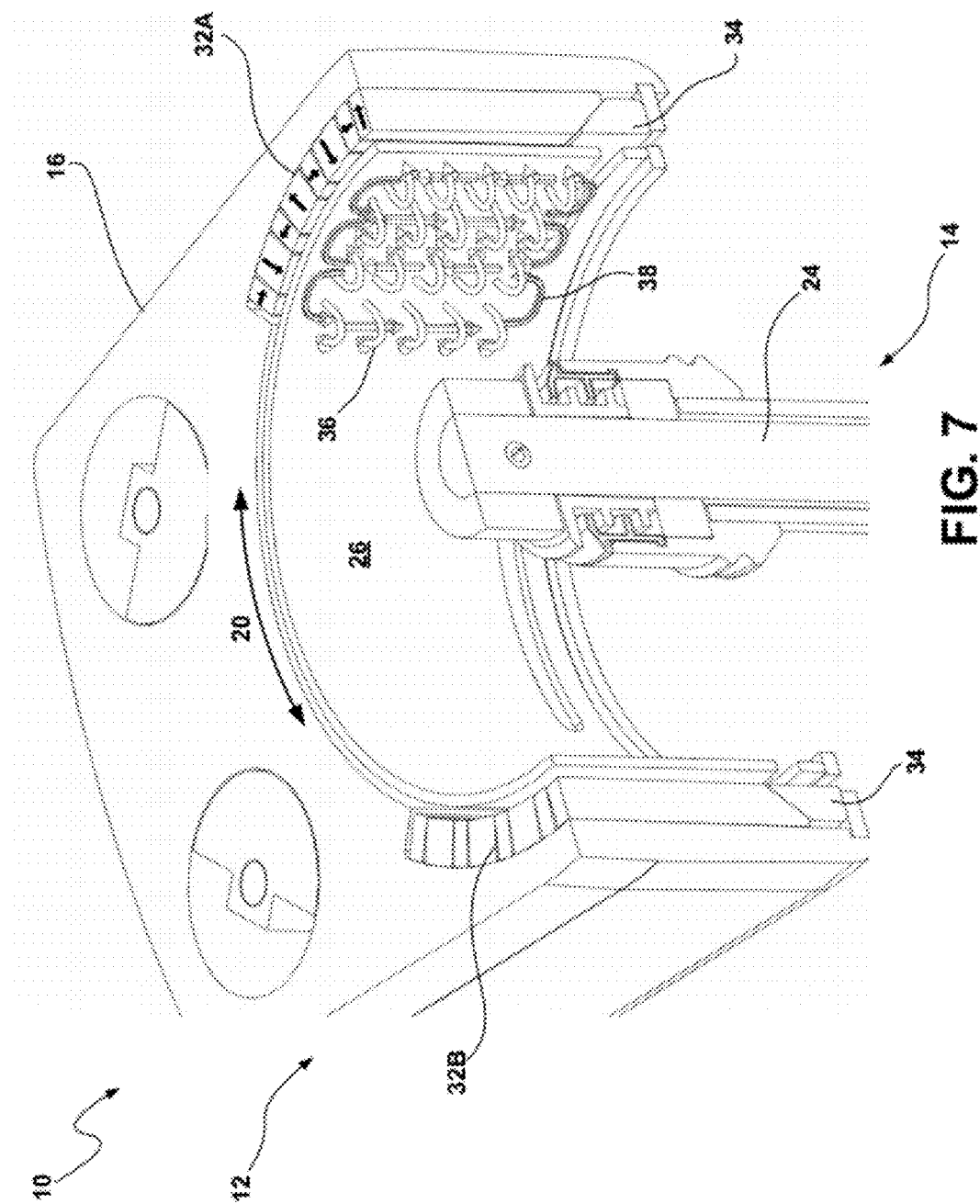

SYSTEM AND METHOD FOR DAMPING A WIND VANE

CROSS-REFERENCE TO RELATED APPLICATIONS

The present application claims the benefit of U.S. Provisional Patent Application Ser. No. 61/425,228, filed Dec. 20, 2010, the entire disclosure of which is incorporated herein by reference.

FIELD

The present disclosure relates generally to wind vanes, and, more particularly, to a system and method for damping rotation of a wind vane.

BACKGROUND

Wind vanes, also referred to as weather vanes, are generally configured to determine the direction of the wind. In general, most, if not all, types of wind vanes share common components and operate in a similar manner when determining wind direction. For example, a wind vane may include a rotating portion and a stationary portion. The rotating portion may include a head coupled to a tail and the stationary portion may include a base, wherein the head and tail are configured to rotate about a vertical axis of rotation in relation to the base (i.e. in a direction parallel to a plane perpendicular to the axis of rotation). The wind vane may be configured to align with the wind aerodynamically. In particular, the rotating portion is configured to move (e.g., rotate) in response to a change in wind direction. A difference in angular position between the stationary portion and the rotating portion generally corresponds to a wind direction.

Wind vanes may be used in a variety of applications. For example, in the wind energy industry, wind wanes may be included in wind turbine control systems. These types of wind vanes may be referred to as turbine control vanes. Wind turbines are generally used in high wind areas and may be subject to strong winds which may change direction from moment to moment. To enable wind turbines to consistently receive the maximum force of wind, movement of a wind turbine may be controlled by a turbine control system, wherein the control system positions the wind turbine, specifically the rotational axis of the wind turbine, to be aligned with the wind vector. The turbine control system takes into account various wind parameters, such as, for example, wind speed and wind direction, when determining the most efficient (i.e. maximum energy extraction) position of the turbine. As such, turbine control systems may include one or more turbine control vanes for the indication of wind direction in order to determine proper positioning of wind turbines.

A common characteristic of wind vanes, including turbine control vanes, is that the rotating portion may oscillate several times about the vertical axis when wind direction changes before pointing into the wind again. Furthermore, turbulence may cause the rotating portion to be positioned off-line relative to the wind vector and remain thus misaligned for a period of time. For example, during operation, a turbine control vane may be disturbed by, for example, a wind gust, sudden change of wind direction, and the like which may cause the turbine control vane to swing uncontrollably. For example, a turbine control vane may be positioned on a wind turbine and may be operating in the wake of the wind turbine rotor. As such, the turbine control vane may be subjected to turbulence with wind speed and direction that may change significantly and quickly. As a result, the turbine control vane may swing wildly and may rotate a full revolution at times. A turbine control system coupled to and communicating with the turbine control vane may be relying on directional data from the turbine control vane in order to determine proper positioning of the wind turbine.

In the event that the turbine control vane is rotating uncontrollably, the vane may present output errors to the turbine control system beyond certain tolerances. In particular, when the control system receives directional data indicating that the vane is swinging uncontrollably, the control system may be configured to shut down the wind turbine as a safety measure. More specifically, uncontrolled swinging of the turbine control vane may indicate strong off-axis winds that may damage the wind turbine if the wind turbine is allowed to continue operating in the current position. Additionally, uncontrolled rotation of the vane may result in increased wear thereby reducing the life of the vane.

As such, some wind vanes, including turbine control vanes, may include damping means to accommodate for any sudden disturbances, such as, for example, wind gusts, sudden changes in wind direction, etc. However, current damping means have several drawbacks. For example, some wind vanes may be under damped (i.e., less than critically damped), particularly in high winds, resulting in poorly damped oscillation after being disturbed by, for example, a wind gust, sudden change of wind direction, turbulence of the turbine rotor, and the like. Additionally, some damping means may cause a wind vane to be inaccurate or unresponsive in low wind conditions. Additionally, some damping methods may reduce the effectiveness of heating systems incorporated into the wind vane and intended to keep the vane, as well as the wind turbine, operational in icing conditions.

BRIEF DESCRIPTION OF THE DRAWINGS

Features and advantages of the present disclosure are set forth by the description of embodiments consistent therewith, which description should be considered in conjunction with the accompanying drawings, wherein:

FIG. 7 is a perspective view, partly in section, of a portion of the vane head and vane base of the wind vane of FIG. 1;

DETAILED DESCRIPTION

The present disclosure is generally directed to a system and method for damping a wind vane. More specifically, a system consistent with the present disclosure includes a wind vane configured to determine wind direction and to communicate with and transmit output corresponding to wind direction to a wind turbine control system. The wind vane includes a damping assembly configured to induce eddy currents to dampen rotational motion of at least a portion of the wind vane.

A damping assembly consistent with the present disclosure may provide damping of a wind vane to accommodate for sudden changes in wind direction while allowing the wind vane to maintain accurate measurements and response in low wind conditions. Additionally, a damping assembly consistent with the present disclosure may reduce the wind vane's susceptibility to oscillation, thereby improving accuracy of the wind vane.

Figure 1:
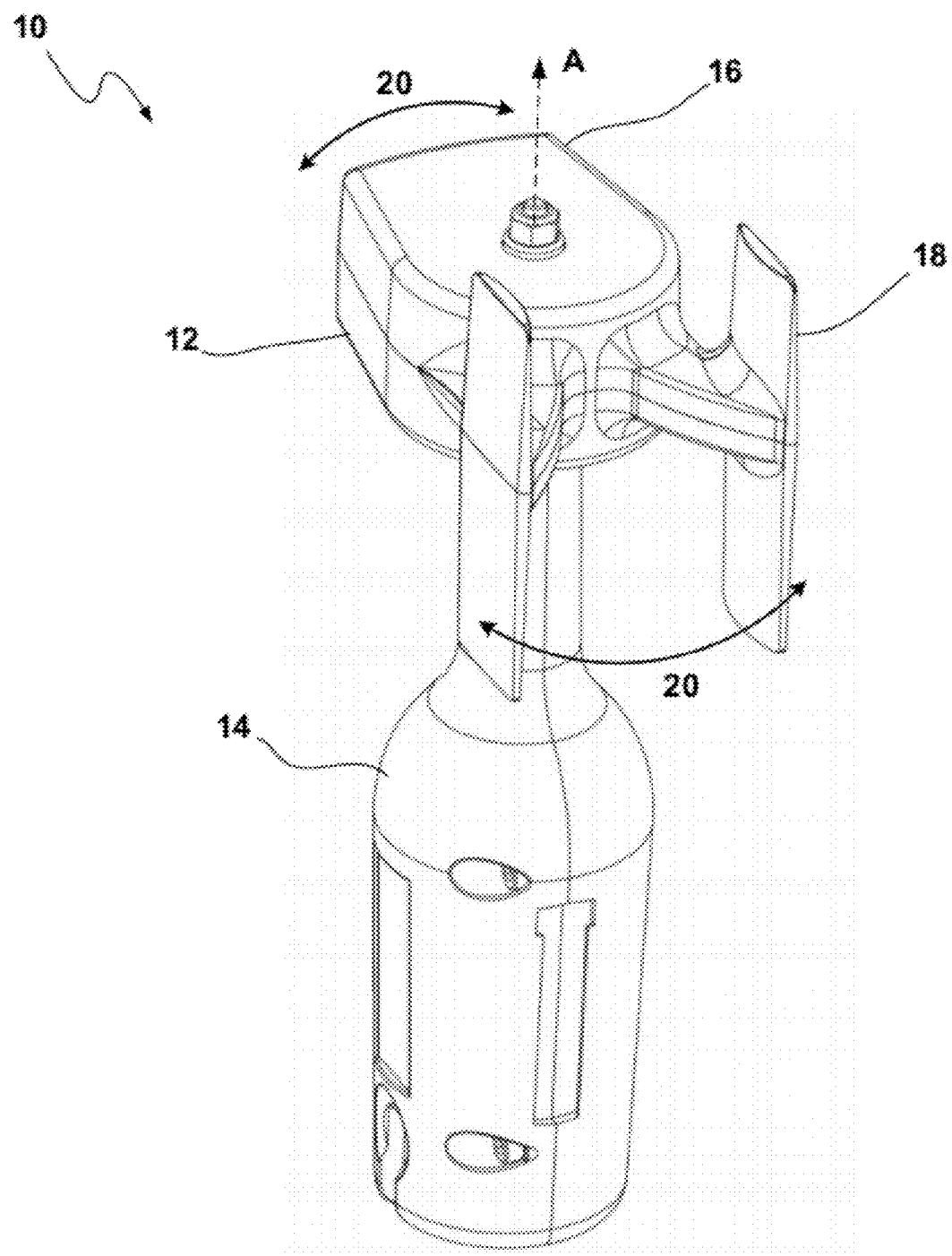
FIG. 1 is a view of a wind vane consistent with the present disclosure.

FIG. 1 is a view of a wind vane consistent with the present disclosure. Generally, the wind vane 10 may include a rotatable member 12 coupled to a stationary member 14 (hereinafter referred to as "base 14"). The rotatable member 12 may include a head portion 16 having a tail portion 18 extending therefrom. The head and tail portions 16, 18 may be configured to rotate about a vertical axis A in relation to the base 14 (i.e. rotate in a direction parallel to a plane perpendicular to vertical axis A). As shown, the vertical axis A may extend through a center of the head portion 16.

During operation, the rotatable member 12 (the head and tail portions 16, 18) may be configured to move (e.g. rotate) in a clockwise and/or counter clockwise direction about axis A in response to a change in wind direction, as indicated by arrows 20. In particular, the rotatable member 12 may freely rotate in the range of 0° to 360° (i.e. complete revolution). A difference in angular position between the base 14 and the rotatable member 12 may correspond to a wind direction.

Figure 2:
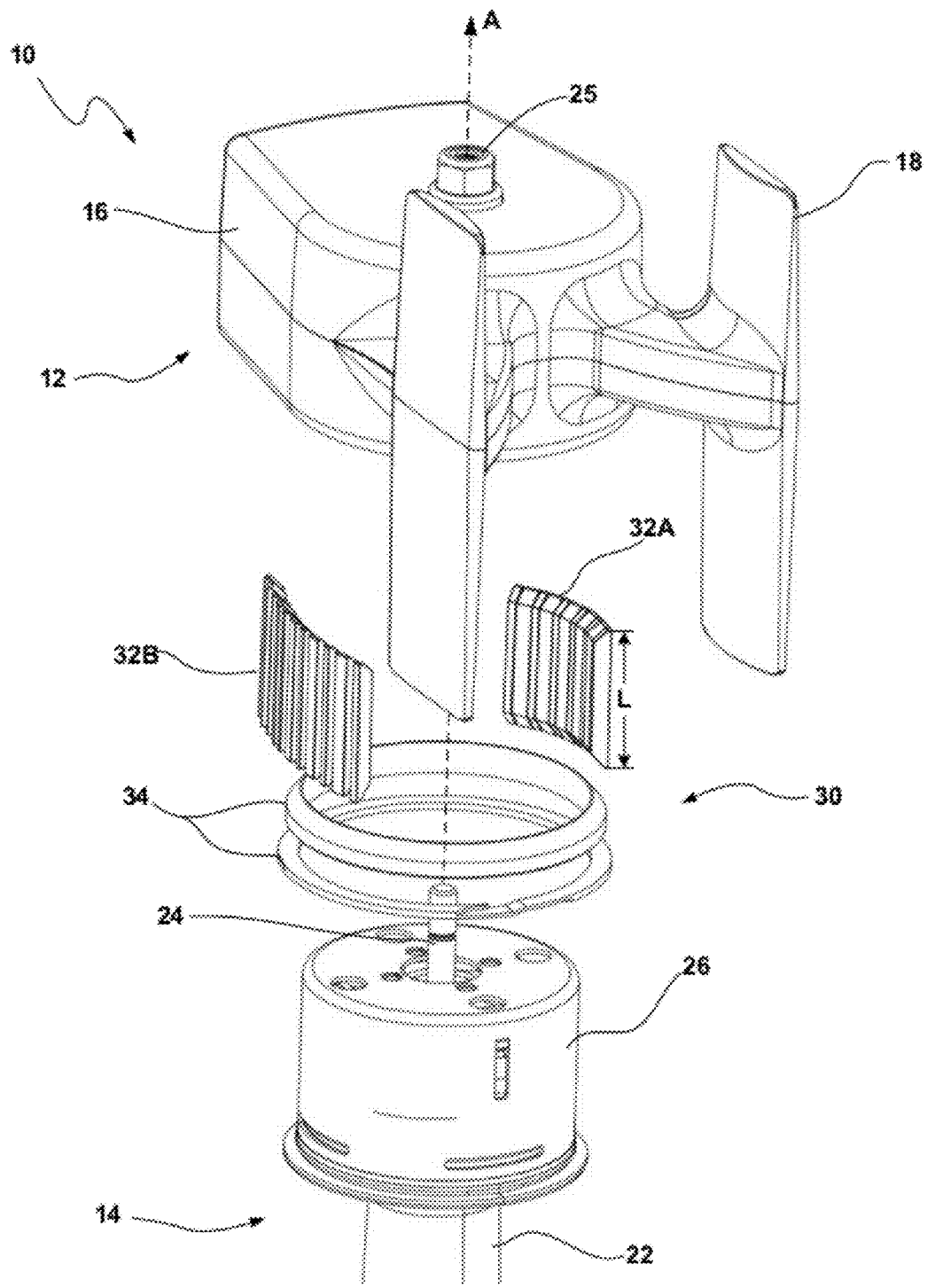
FIG. 2 is an exploded view of a portion of the wind vane of FIG. 1.
Figure 3:
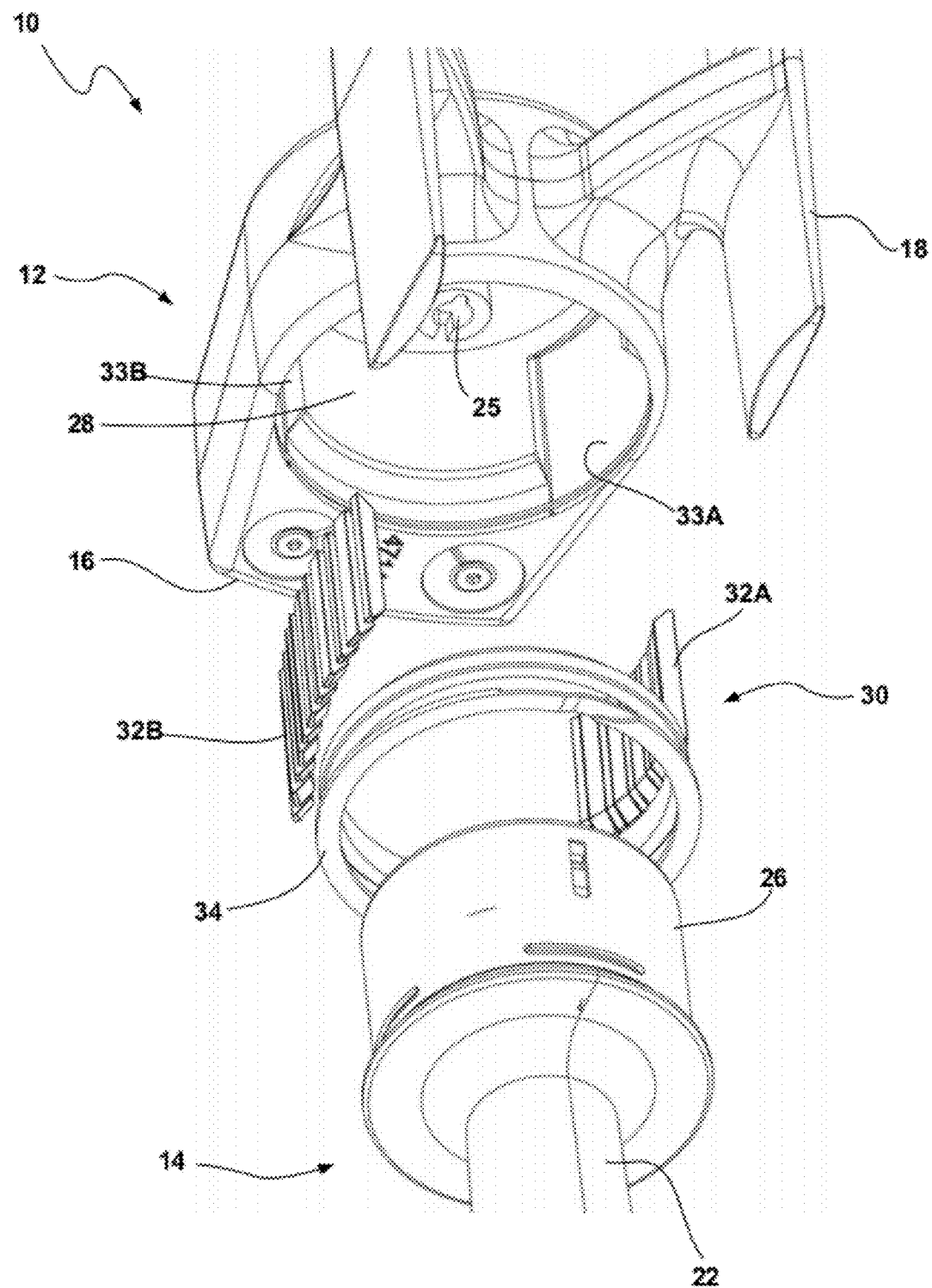
FIG. 3 is another exploded view of a portion of the wind vane of FIG. 1.

FIGS. 2 and 3 are exploded views of a portion of the wind vane 10 of FIG. 1. As shown, the base 14 may include a body 22 configured to support the rotatable member 12. The body 22 may further house sensors (not shown) configured to determine wind direction based on rotational movement of the rotatable head 12 and transmit such data to, for example, a turbine control system, or components thereof (e.g. wind turbine controllers, programmable logic controllers (PLCs), data loggers, etc.). In particular, a shaft member 24 may extend from the body 22 and along vertical axis A, wherein the shaft member 24 may further extend through and be coupled to a portion (i.e. bore 25) of the head portion 16 of the rotatable member 12.

In the illustrated embodiment, the base 14 may further include a heater element 26 coupled to a portion of the body 22. The heater element 26 may be configured to heat (i.e. provide thermal energy) to the rotatable member 12 and/or base 14 of the wind vane 10, such that the wind vane 10 may operate in low temperature conditions (i.e. wind vane 10 exposed to temperatures below freezing). The rotatable member 12, specifically the head portion 16, may include a cavity 28 defined on a bottom portion adjacent the base 14. The cavity 28 may be configured to receive a portion of the base 14 when the wind vane is assembled (i.e. the rotatable member 12 coupled to the base 14). In particular, the cavity 28 may be shaped and/or sized to receive the heater element 26 and shaft member 24 of the body 22.

Heated wind vanes may have higher inertia and lower aerodynamic damping than non-heated wind vanes due to construction of the heated wind vane. These properties may tend to exacerbate the under damping. For example, the rotatable member 12 of the heated wind vane 10 may be constructed of material(s) that have a relatively high density (with a relatively higher heat transfer coefficient). The rotatable member 12 may further be constructed with thick sections (i.e., more cross sectional area for heat transfer) and with relatively short distances along the material(s) from a heat source to aerodynamic elements, such as, for example, tail feathers.

As a result, heated wind vanes may produce relatively low torque for a given angular distance from an equilibrium position. When combined with frictional drag of rotating components, a heated wind vane may be inaccurate and/or unresponsive in low wind situations. Further, wind vanes that are relatively heavy and/or have a relatively short distance between an axis of rotation and aerodynamic elements may have relatively poor aerodynamic damping characteristics.

Accordingly, the wind vane 10 may further include a damping assembly 30 configured to dampen rotational movement of the rotatable member 12 without sacrificing accuracy and responsiveness in low wind conditions. As shown, the damping assembly 30 may include a first array of magnets 32A and a second array of magnets 32B opposing the first array of magnets 32A. As shown, the first array of magnets are depicted in a normal position (i.e. Halbach Array, described in greater detail herein) and the second array of magnets 32B is depicted spaced apart to illustrate each individual magnet included in the second array 32B. The damping assembly 30 may further include a stationary electrical conductor member 26 upon which the first and second arrays of magnets 32A, 32B may project respective magnetic fields. In the illustrated embodiment, the heater element 26 may include conductive material, and, as such, serve as the electrical conductor member 26 (hereinafter referred to as "conductor 26"). It should be noted that, according to other embodiments, a wind vane consistent with the present disclosure may include an electrical conductor member separate from the heater member. Additionally, according to some embodiments, a wind vane consistent with the present disclosure may not include a heater element.

In the illustrated embodiment, the first and second arrays of magnets 32A, 32B may be positioned within the head portion 16 of the rotatable member 12. In particular, the first and second arrays 32A, 32B may be positioned within corresponding recesses 33A, 33B defined along the inner circumference of the cavity 28 of the head portion 16 of the rotatable member 12. The damping assembly 30 may further include a means of retaining the first and second arrays of magnets 32A, 32B within the respective recesses 33A, 33B, such as ring members 34.

As shown, the first and second arrays 32A, 32B may be distributed over at least a portion of the inner circumference of the head portion 16. Each magnet in the first and second arrays 32A, 32B may have a length L perpendicular to the circumferential direction of the head portion 16. The length L of each magnet may be configured to sweep a relatively large area of the conductive material of the conductor 26 for any given amount of rotation to produce relatively strong eddy currents in the stationary conductor 26 and to thereby enhance eddy current damping, described in greater detail herein.

The number and/or size of the magnets in the first and second arrays 32A, 32B may be adjusted, e.g., increased, in order to increase field strength. Magnetic materials may include, but are not limited to, Neodyminum Iron Boron, Samarium Cobalt and Alnico. A magnet material may be selected based, at least in part, on field strength, corrosion resistance, cost, temperature resistance, ease of assembly and/or availability.

As described in greater detail herein, the damping assembly 30 may be configured to utilize eddy currents to dampen rotational movement of the rotatable member 12 to accommodate for sudden changes in wind direction while allowing the wind vane 10 to maintain accurate measurements and response in low wind conditions. It may be appreciated that in order to produce sufficient damping using eddy currents, it is desirable to create a relatively strong magnetic field in as much conductive material as possible. This may be achieved by generating a relatively strong magnetic field (e.g., with strong magnets and a good (e.g., low loss) magnetic circuit), and projecting the magnetic field into and/or through the conductor 26 (i.e., shaping the magnetic field). It may further be desirable to produce a magnetic field shape that is configured to change sign and/or strength relatively quickly at a given point in the conductor 26 for a given amount of motion (e.g., rotation). It may also be desirable to produce as little magnetic field in areas adjacent to the vane 10 so as to minimize effects on nearby devices and/or to minimize effects on the vane 10 from nearby devices.

This may be achieved with a magnetic field pattern that is configured to vary the magnetic field strength and polarity a substantial number of times during one rotation around the conductor 26. It may further be desirable to maximize the conductivity of the conductor 26, e.g., by using relatively highly conductive material of appropriate cross section (e.g., thickness) and with uninterrupted electrical paths. For example, conductive material may include, but is not limited to, aluminum, copper, silver and gold.

A relatively strong magnetic field may present challenges. For example, a strong magnetic field external to the wind vane 10 may cause magnetic materials to be attracted to wind vane sensors and sensor magnets positioned in or on the rotatable member 12 may be attracted to other items nearby. Such attraction may degrade the accuracy of the sensor because the sensor may be responding to these other items rather than the wind. Shielding may reduce these effects but it may be difficult to be effective without using relatively large amounts of shielding. Depending on the construction, heat transmission to the rotatable member 12 may be compromised by one or more of these design choices.

Figure 4:
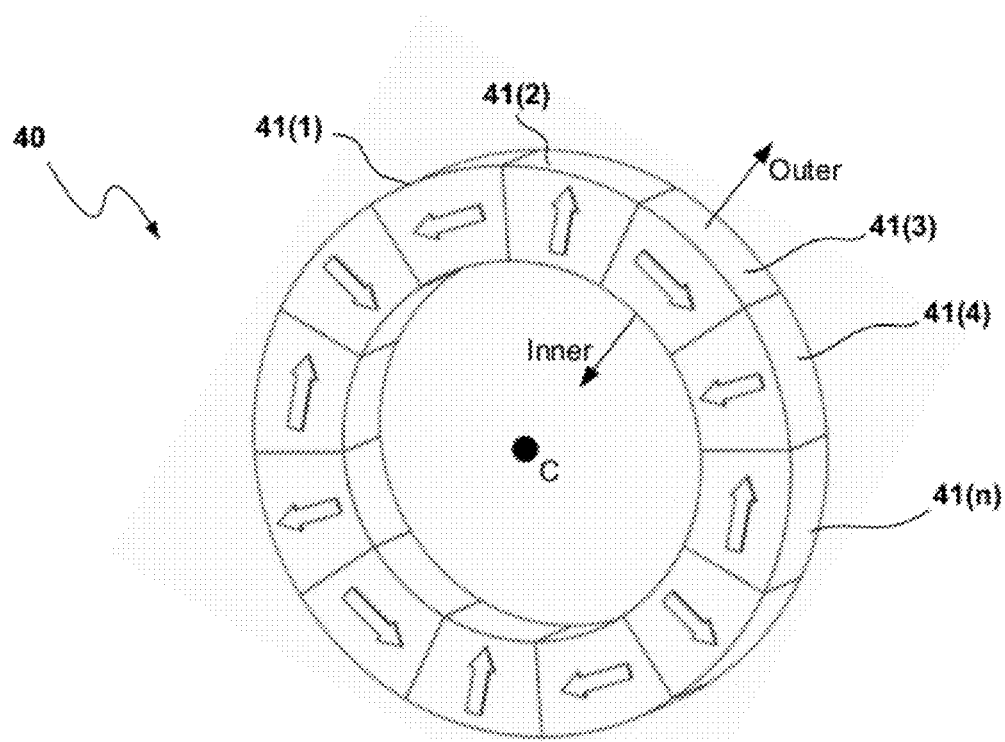
FIG. 4 is perspective view of one embodiment of a Halbach array of magnets consistent with the present disclosure.
Figure 5:
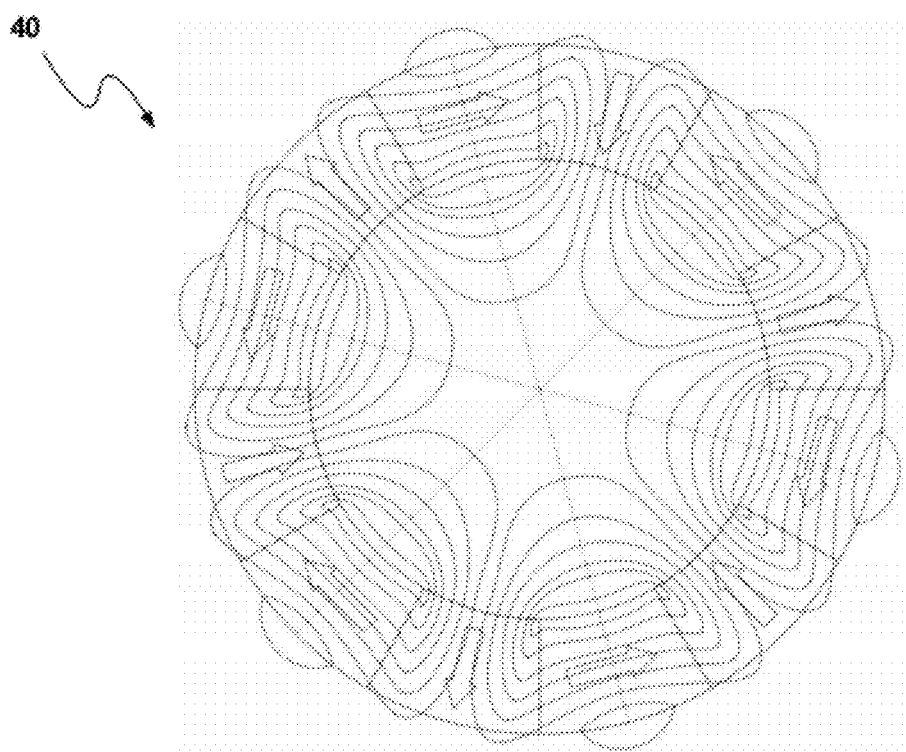
FIG. 5 is an illustration of a magnetic flux pattern of the circular Halbach array of magnets of FIG. 4.

FIG. 4 is perspective view of one embodiment of a Halbach array of magnets consistent with the present disclosure and FIG. 5 is an illustration of a magnetic flux pattern of the circular Halbach array of magnets of FIG. 4. Referring to FIG. 4, a Halbach array 40 may be utilized to provide a desired magnetic field shape and may limit the magnetic field external to the wind vane 10. As previously described, for example, the first and second array of magnets 32A, 32B may be arranged in a Halbach array. As generally understood by one or ordinary skill in the art, Halbach arrays may be configured to provide unequal magnetic fields on opposing sides of the array. Halbach arrays limit their field on one side of the array, and may thus eliminate the need for shielding on one side, while projecting strong fields perpendicular to the array on the opposing side.

For example, as shown in FIG. 4, a Halbach array 40 of magnets 41(1)-41(n) is illustrated in a ring form. However, it should be noted that Halbach arrays consistent with the present disclosure may include various shapes and/or dimensions depending on the application, such as, for example, semi-circular, curvilinear, bar, sheet, etc. As shown, the magnetic orientation of each magnet 41(1)-41(n) (hereinafter referred to as "magnet 41" for ease of description) in the array is indicated as an arrow. The arrow head indicates the north pole and the arrow tail indicates the south pole of each magnet 41. As shown, each magnet 41 in the array may be positioned such that the orientation of each magnet is at a right angle with the orientation of an adjacent magnet 41 in the array.

According to the orientation of the magnets 41 as depicted, a relatively stronger magnetic field may be produced in an inner radial direction, as indicated by arrow (Inner), toward a center C of the ring. A relatively weaker magnetic field may be produced in an outer radial direction, as indicated by arrow (Outer), from an outer surface of the ring. Referring to FIG. 5, a magnetic flux pattern for a ring Halbach array 40 corresponding to FIG. 4 is depicted. As previously discussed, the first and second arrays of magnets 32A, 32B, in accordance with FIGS. 4 and 5, may be Halbach arrays and may be positioned in the rotatable member 12 of the wind vane 10, with a conductor 26 positioned on the base 14 (stationary portion).

In another embodiment, the orientation of some of the magnets 41 in the Halbach array 40 may be reversed so as to reverse the strength of magnetic fields in the inner and outer radial directions of the Halbach array 40. In particular, with respect to the Halbach array 40 of FIG. 4, the magnetic orientation of each radially magnetized magnet (e.g. 41(2) and 41(4)) of the Halbach array 40 may be reversed while the magnetic orientation of each circumferentially magnetized magnet (e.g. 41(1) and 41(3)) of the Halbach array 40 remains unchanged. If the orientation of each radially magnetized magnet in the first and second arrays 32A, 32B is reversed, a relatively weaker magnetic field may be produced in the inner radial direction and a relatively stronger magnetic field may be produced in the outer radial direction. In accordance with this example (reversing orientation of each radially magnetized magnet), the first and second arrays of magnets 32A, 32B may be positioned on a portion of the base 14 (stationary member) of the wind vane 10 and the conductor 26 may be positioned on a portion of the rotatable member 12. Continuing with this example, a pole piece (not shown) may be positioned such that the conductor 26 is positioned between the first and second arrays 32A, 32B and the pole piece. The pole piece may be configured to reduce and/or minimize an external magnetic field.

Figure 6:
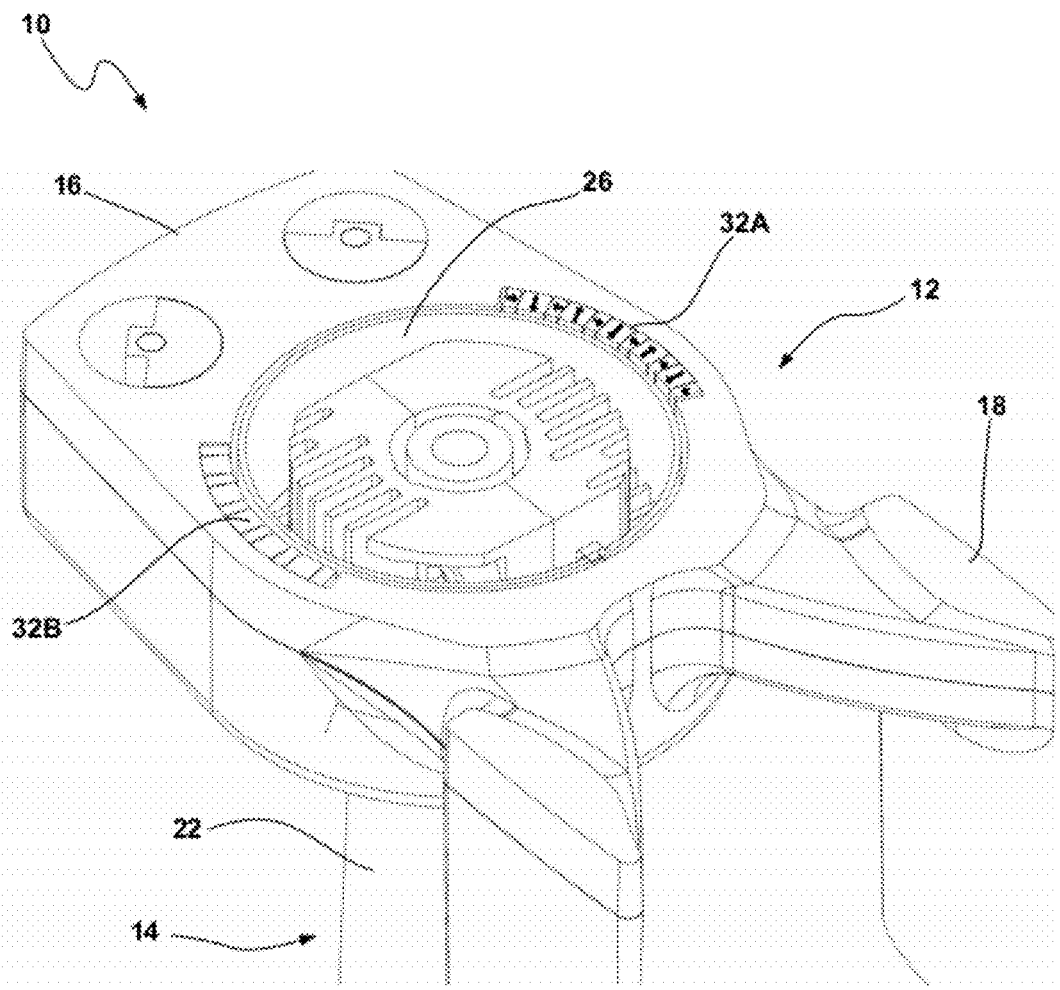
FIG. 6 is a perspective view, partly in section, of the wind vane of FIG. 1.

FIG. 6 is a perspective view, partly in section, of the wind vane of FIG. 1. As shown, the first and second arrays of magnets 32A, 32B may be positioned along a portion of the inner circumference of the cavity 28 of the head portion 16. Each of the magnets of the first and second arrays 32A, 32B may be permanent magnets and may be configured to project an associated magnetic field onto the conductor 26 positioned on the base 14. As previously described, the first and second arrays 32A, 32B of magnets may be Halbach arrays. The magnetic orientation of each magnet of at least the first array 32A is illustrated.

It should be noted that, in other embodiments, the first and second arrays 32A, 32B may be positioned on the base 14 (stationary member) and the conductor 26 may be positioned on the rotatable member 12. In other words, the conductor 26 may rotate about the stationary first and second arrays of magnets 32A, 32B positioned on the base 14. As such, as previously described above, the magnetic orientation of some of the magnets of the first and/or second arrays 32A, 32B may be reversed. More specifically, the magnetic orientation of the radially magnetized magnets may be reversed while the magnetic orientation of the circumferentially magnetized magnets remains the same.

FIG. 7 is a perspective view, partly in section, of the rotatable member 12 and base 14 of the wind vane 10 of FIG. 1, illustrating magnetic flux 36 and eddy currents 38 provided by the damping assembly 30. As shown, as the head portion 16 of the rotatable member 12 rotates relative to the base 14 (indicated by arrow 20), the magnetic field (magnetic flux 36) created by the first and second arrays of magnets 32A, 32B (Halbach Arrays) moves, thereby varying the magnetic field strength and direction for a portion of the conductive material 26. The varying magnetic field may induce currents to flow (e.g., eddy currents, indicated by arrow 38) within the conductor 26. More specifically, the eddy currents 38 may result in the generation of a second magnetic field (not shown) that opposes the magnetic field (i.e. magnetic flux 36) of the magnets of the first and second arrays 32A, 32B (Lenz' Law). The second magnetic field thereby opposes the motion of the magnets of the first and second arrays 32A, 32B, and, in turn, opposes the motion of the head portion 16 of the rotatable member 12, which may result in Eddy Current Damping.

The induced eddy currents 38 may oppose the rotation of the head portion 16 relative to the base 14, thereby providing damping that is proportional to the angular velocity of the head portion relative to the base 14. In other words, the damping provided by the damping assembly 30 may be proportional to a rotational velocity of the rotatable member 12 relative to the base 14. The "drag" produced by the eddy currents 38 is proportional to the rotational velocity of the rotatable member 12 and is configured to decrease to zero at zero rotational velocity. Accordingly, the rotational velocity-dependent drag may not affect low wind speed direction sensing accuracy and may damp vane swinging at relatively higher wind speeds.

Figure 8A:
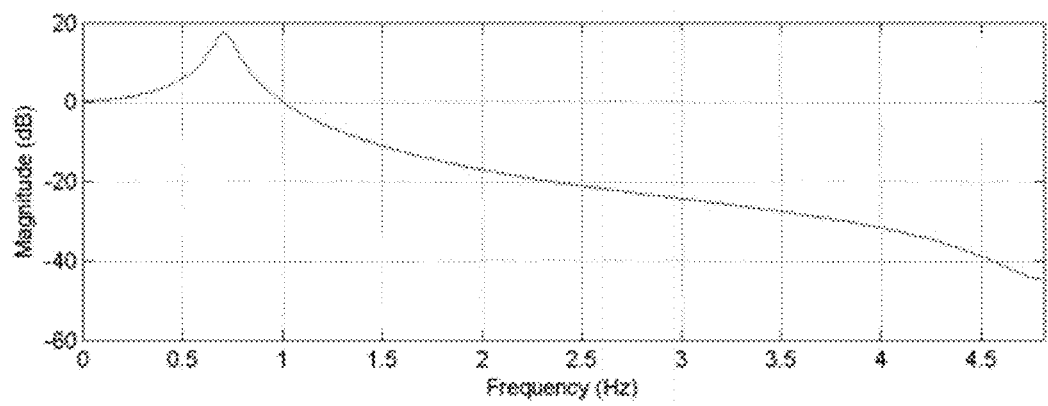
FIGS. 8A and 8B are plots of magnitude and phase versus frequency illustrating damping of a conventional wind vane.
Figure 8B:
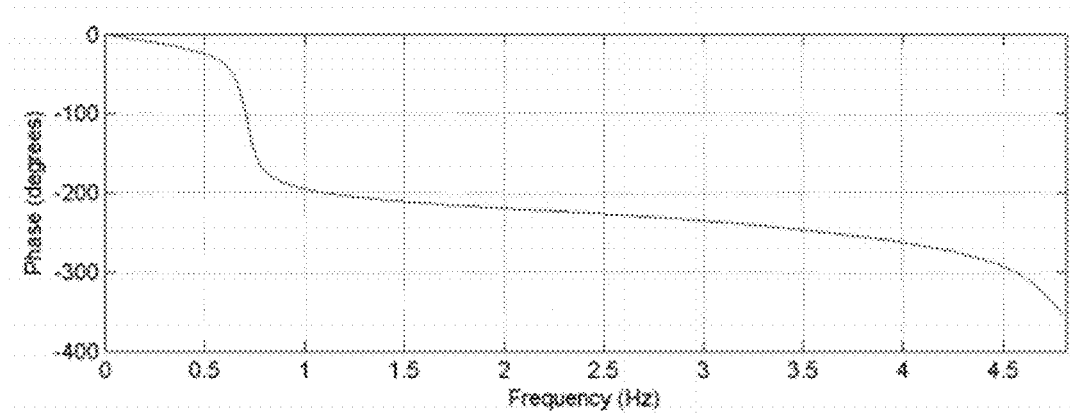
Figure 9A:
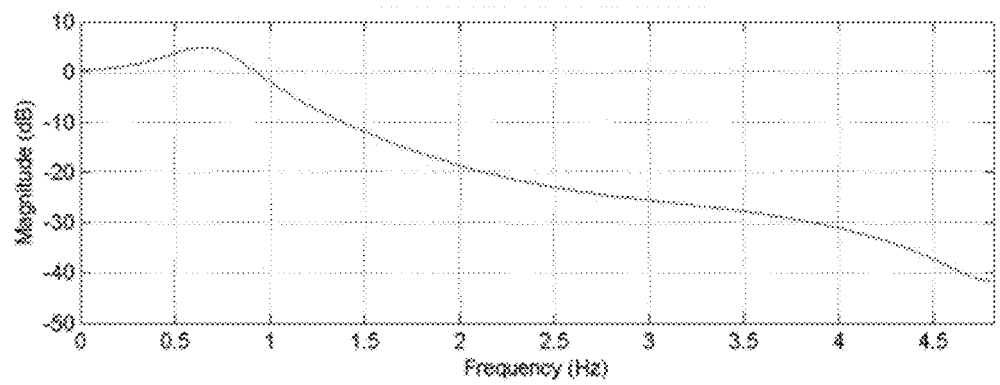
FIGS. 9A and 9B are plots of magnitude and phase versus frequency illustrating damping of the wind vane of FIG. 1.
Figure 9B:
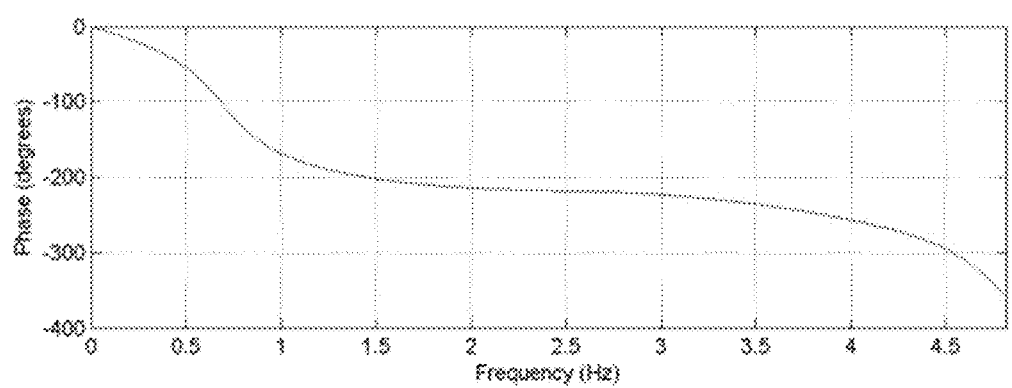

FIGS. 8A and 8B are plots of magnitude and phase versus frequency illustrating damping of a conventional wind vane (wind vane without Halbach Array), at a given wind speed. FIGS. 9A and 9B are plots of magnitude and phase versus frequency illustrating damping of the wind vane of FIG. 1 (having Halbach Array), at the same wind speed as for the conventional wind vane of FIGS. 8A and 8B. A conventional wind vane without a damping assembly consistent with the present disclosure yields a natural resonance between 0.5 and 1 Hz with a resonant peak of approximately 18 dB. A wind vane having a damping assembly (Halbach Array) consistent with the present disclosure yields a resonant peak of approximately 5 dB. Similar advantages accrue at other wind speeds.

It should be noted that, in some of the embodiments described above, Halbach arrays were positioned in the head portion of the rotatable member and the conductor was positioned in the base. In other embodiments, the Halbach arrays were positioned in the base and the conductor was positioned in the head portion of the rotatable member. In embodiments having Halbach Arrays positioned in the head portion, an external magnetic field was generally reduced and/or eliminated without using a pole piece. However, this embodiment may be sensitive to magnetic materials on the non-rotating portions of the wind vane. In other words, magnets tend to align with magnetic materials and such tendency to alignment may detrimentally affect low-wind-speed accuracy. Positioning the magnets in the base with the conductor material in the rotatable member may reduce sensitivity to magnetic materials. However, Halbach arrays positioned in the base may provide relatively less damping if pole pieces are not used. As such, a pole piece may be included to reduce and/or eliminate the external magnetic field. Use of pole pieces may facilitate achieving increased field strength in the conductor and/or reducing stray magnetic fields.

Wind vanes consistent with the present disclosure may be used as "W vanes" configured to measure up and/or down slope direction of the wind. W vanes may be positioned "sideways" relative to the wind vanes describe above. It should be noted that wind vanes consistent with the present disclosure may be un-heated.

According to one aspect of the disclosure there is provided a wind vane configured to determine wind direction. The wind vane includes a base and a rotatable member having a head portion and a tail portion extending therefrom, wherein the head portion being rotationally coupled to and supported on the base for movement about a substantially vertical axis. The head portion is configured to fully rotate about the substantially vertical axis relative to the base. The wind vane further includes a damping assembly positioned between a portion of the rotatable member and a portion of the base. The damping assembly is configured to provide eddy currents to dampen movement of the rotatable member with respect to the base.

According to another aspect of the disclosure there is provided a system including a wind turbine control system configured to control positioning of a wind turbine based at least on wind direction. The system further includes a wind vane coupled to the wind turbine control system and configured to communicate wind direction data to the wind turbine control system. The wind vane includes a base and a rotatable member having a head portion and a tail portion extending therefrom, wherein the head portion is rotationally coupled to and supported on the base for movement about a substantially vertical axis. The rotatable member is configured to fully rotate about the vertical axis. The wind vane further includes a damping assembly positioned between a portion of the rotatable member and a portion of the base. The damping assembly is configured to provide eddy currents to dampen movement of the rotatable member with respect to the base. The damping provided by the eddy currents of the damping assembly is proportional to a rotational velocity of the rotatable member relative to the base, wherein the damping is configured to decrease to zero at zero rotational velocity of the rotatable member.

According to yet another aspect of the disclosure there is provided a method of damping movement of a wind vane. The method includes providing a magnetic flux from a magnetic element of a damping assembly of the wind vane and engaging the magnetic flux by an electrical conductor member of the damping assembly. The method further includes generating, in the electrical conductor member, eddy currents, wherein the eddy currents are configured to provide damping of movement of a rotatable member of the wind vane with respect to a stationary base of the wind vane. The damping provided by the eddy currents is proportional to a rotational velocity of the rotatable member relative to the base, wherein the damping is configured to decrease to zero at zero rotational velocity of the rotatable member.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A wind vane system comprising:
   a base;
   a rotatable member having a head portion and a tail portion extending therefrom, said head portion being rotationally coupled to and supported on said base for movement about a substantially vertical axis, said head portion configured to fully rotate about said substantially vertical axis relative to said base; and
   a damping assembly positioned between a portion of said rotatable member and a portion of said base, wherein said damping assembly comprises:
      at least one Halbach array of magnets configured to provide a magnetic flux that is stronger, in a plane perpendicular to said substantially vertical axis, in an inner radial direction or an outer radial direction; and
      an electrical conductor member configured to engage said magnetic flux provided by said at least one Halbach array of magnets and produce eddy currents to dampen movement of said rotatable member with respect to said base.

2. The wind vane system of claim 1 wherein said at least one Halbach array of magnets is positioned on a portion of said rotatable member; and
   said electrical conductor member is positioned on a portion of said base.

3. The wind vane system of claim 2 wherein said electrical conductor member is configured to provide thermal energy to said base and said rotatable member.

4. The system of claim 2, wherein said at least one Halbach array of magnets is configured to provide said magnetic flux extending primarily radially inwardly from said at least one Halbach array of magnets in said plane generally toward said substantially vertical axis.

5. The wind vane system of claim 1 wherein said at least one Halbach array of magnets is positioned on a portion of said base; and
   said electrical conductor member is positioned on a portion of said rotatable member.

6. The wind vane system of claim 5 wherein said electrical conductor member is configured to provide thermal energy to said base and said rotatable member.

7. The wind vane system of claim 1 wherein damping provided by said eddy currents of said damping assembly is proportional to a rotational velocity of said rotatable member relative to said base, wherein said damping being configured to decrease to zero at zero rotational velocity of said rotatable member.

8. The system of claim 1, further comprising a wind turbine control system configured to control positioning of a wind turbine based at least on wind direction, wherein said wind vane is coupled to said wind turbine control system and configured to communicate wind direction data to said wind turbine control system.

9. A system comprising:
   a wind vane comprising:
      a base;
      a rotatable member having a head portion and a tail portion extending therefrom, said head portion being rotationally coupled to and supported on said base for movement about a substantially vertical axis, said rotatable member configured to fully rotate about said vertical axis; and
      a damping assembly positioned between a portion of said rotatable member and a portion of said base, wherein said damping assembly comprises:
         at least one magnetic element configured to provide a magnetic flux that is stronger, in a plane perpendicular to said substantially vertical axis, in an inner radial direction or an outer radial direction; and
         an electrical conductor member configured to engage said magnetic flux provided by said at least one magnetic element and produce eddy currents to provide damping of movement of said rotatable member with respect to said base;
         wherein said electrical conductor member is also a heater configured to heat said base and said rotatable member such that said wind vane may operate at a temperature below freezing.

10. The system of claim 9 wherein said
    at least one magnetic element is positioned on a portion of said rotatable member; and
    said electrical conductor member is positioned on a portion of said base.

11. The system of claim 10 wherein said at least one magnetic element comprises at least one array of magnets positioned on a portion of said rotatable member, wherein said array of magnets is a Halbach array.

12. The system of claim 9 wherein said
    at least one magnetic element is positioned on a portion of said base; and
    said electrical conductor member is positioned on a portion of said rotatable member.

13. The system of claim 12 wherein said at least one magnetic element comprises at least one array of magnets positioned on a portion of said base, wherein said array of magnets is a Halbach array.

14. The system of claim 9, further comprising a wind turbine control system configured to control positioning of a wind turbine based at least on wind direction, wherein said wind vane is coupled to said wind turbine control system and configured to communicate wind direction data to said wind turbine control system.

15. The system of claim 9, wherein said at least one magnetic element is configured to provide said magnetic flux extending primarily radially inwardly from said at least one magnetic element in said plane generally toward said substantially vertical axis.

16. A method of damping movement of a wind vane having a rotatable member coupled to a stationary base and configured to rotate about a substantially vertical axis, said method comprising:
- providing a magnetic flux from at least one magnetic element of a damping assembly, wherein said magnetic flux is stronger, in a plane perpendicular to said substantially vertical axis, in an inner radial direction or an outer radial direction, said damping assembly being positioned between said rotatable member and said stationary base of said wind vane;
- engaging said magnetic flux by an electrical conductor member of said damping assembly;
- heating said base and said rotatable member with said electrical conductor member such that said wind vane may operate at a temperature below freezing; and
- generating, in said electrical conductor member, eddy currents configured to provide damping of movement of said rotatable member with respect to said stationary base of said wind vane,
- wherein damping provided by said eddy currents is proportional to a rotational velocity of said rotatable member relative to said stationary base, said damping being configured to decrease to zero at zero rotational velocity of said rotatable member.

17. The method of claim 16 wherein said at least one magnetic element is positioned on a portion of said rotatable member and said electrical conductor member is positioned on a portion of said base.

18. The method of claim 17 wherein said at least one magnetic element comprises at least one array of magnets positioned on a portion of said rotatable member, wherein said array of magnets is a Halbach array.

19. The method of claim 16 wherein said at least one magnetic element is positioned on a portion of said base and said electrical conductor member is positioned on a portion of said rotatable member.

20. The method of claim 19 wherein said at least one magnetic element comprises at least one array of magnets positioned on a portion of said base, wherein said array of magnets is a Halbach array.

21. The method of claim 16, wherein said at least one magnetic element is configured to provide said magnetic flux extending primarily radially inwardly from said at least one magnetic element in said plane generally toward said substantially vertical axis.

* * * * *